(12) United States Patent
Leverenz et al.

(10) Patent No.: US 12,025,998 B2
(45) Date of Patent: Jul. 2, 2024

(54) METHOD FOR STORING A MEDIUM IN A PRESSURE ACCUMULATOR DEVICE

(71) Applicant: HPS Home Power Solutions AG, Berlin (DE)

(72) Inventors: Hendrik Leverenz, Berlin (DE); Wilma Reuter, Berlin (DE); Johannes Wiemann, Berlin (DE)

(73) Assignee: HPS Home Power Solutions AG (DE)

( * ) Notice: Subject to any disclaimer, the term of this patent is extended or adjusted under 35 U.S.C. 154(b) by 351 days.

(21) Appl. No.: 17/416,719

(22) PCT Filed: Dec. 18, 2019

(86) PCT No.: PCT/EP2019/086005
§ 371 (c)(1),
(2) Date: Jun. 21, 2021

(87) PCT Pub. No.: WO2020/127520
PCT Pub. Date: Jun. 25, 2020

(65) Prior Publication Data
US 2022/0129022 A1 Apr. 28, 2022

(30) Foreign Application Priority Data
Dec. 20, 2018 (DE) .................. 10 2018 133 199.1

(51) Int. Cl.
*G05D 16/20* (2006.01)
*F17C 13/02* (2006.01)
(Continued)

(52) U.S. Cl.
CPC .......... *G05D 16/20* (2013.01); *F17C 13/025* (2013.01); *F17C 13/026* (2013.01); *G05B 15/02* (2013.01);
(Continued)

(58) Field of Classification Search
CPC ..... G05D 16/20; F17C 13/025; F17C 13/026; F17C 2221/012; F17C 2250/032;
(Continued)

(56) References Cited

U.S. PATENT DOCUMENTS 5,570,729 A * 11/1996 Mutter .................... F17C 13/02
141/2
10,295,121 B2 * 5/2019 Handa .................. F17C 13/028
(Continued)

FOREIGN PATENT DOCUMENTS

DE 10 2016 203 336 9/2017
EP 1593905 11/2005
(Continued)

OTHER PUBLICATIONS

SAE International, J2601, Fueling Protocols for Light Duty Gaseous Hydrogen Surface Vehicles, Dec. 6, 2016 (submitted in two parts).

*Primary Examiner* — Timothy L Maust
(74) *Attorney, Agent, or Firm* — Pandiscio & Pandiscio

(57) ABSTRACT

The present invention relates, inter alia, to a method for storing a medium, in particular a gas, in a pressure storage device (31), wherein, in a preferred embodiment, a dynamic operating pressure, which is dependent on measured temperature values and up to which the medium can be stored in the pressure storage device (31), is determined. In particular, the invention allows dynamic storing of medium in the pressure storage device (31) in respect of the storage pressure, in particular the operating pressure, with a simple design. This is achieved by the dynamic operating pressure being determined, in particular calculated, on the basis of dynamic reference temperature values as a function of time. The method is preferably carried out in an energy system (10), having at least one energy source device (21) for
(Continued)

generating a medium and a pressure storage device (31), spatially separated therefrom, for storing the generated medium.

18 Claims, 2 Drawing Sheets

(51) Int. Cl.
  *G05B 15/02* (2006.01)
  *H01M 8/04082* (2016.01)
  *H01M 8/0432* (2016.01)
  *H01M 8/04746* (2016.01)

(52) U.S. Cl.
  CPC ... *H01M 8/04201* (2013.01); *H01M 8/04328* (2013.01); *H01M 8/04753* (2013.01); *H01M 8/04776* (2013.01); *F17C 2221/012* (2013.01); *F17C 2250/032* (2013.01); *F17C 2250/043* (2013.01); *F17C 2250/0439* (2013.01); *F17C 2250/0626* (2013.01)

(58) Field of Classification Search
  CPC ........ F17C 2250/043; F17C 2250/0439; F17C 2250/0626; H01M 8/04201
  See application file for complete search history.

(56) References Cited

U.S. PATENT DOCUMENTS

| | | | | |
|---|---|---|---|---|
| 10,571,076 | B2* | 2/2020 | Wistoft-Ibsen | F17C 13/026 |
| 10,816,139 | B2* | 10/2020 | Bourgeois | F17C 5/06 |
| 2007/0125441 | A1* | 6/2007 | Farese | F17C 5/06 141/2 |
| 2009/0044877 | A1* | 2/2009 | Faudou | F17C 5/06 141/83 |
| 2011/0022337 | A1* | 1/2011 | Macron | F17C 13/025 702/55 |
| 2011/0259469 | A1* | 10/2011 | Harty | F17C 13/023 141/4 |
| 2014/0174593 | A1* | 6/2014 | Ammouri | F17C 5/06 141/4 |
| 2015/0308621 | A1* | 10/2015 | Mathison | F17C 5/06 141/94 |
| 2016/0273710 | A1* | 9/2016 | Wistoft-Ibsen | F17C 13/026 |
| 2016/0305611 | A1* | 10/2016 | Handa | F17C 13/023 |

FOREIGN PATENT DOCUMENTS

| | | |
|---|---|---|
| EP | 2063166 | 5/2009 |
| WO | WO 2017/089468 | 6/2017 |
| WO | WO 2017/089469 | 6/2017 |

* cited by examiner

| Month | Jan-Aug | Sep | Oct | Nov-Dec |
|---|---|---|---|---|
| T_reff (°C) | 35 | 25 | 20 | 15 |

Fig. 2

METHOD FOR STORING A MEDIUM IN A PRESSURE ACCUMULATOR DEVICE

REFERENCE TO PENDING PRIOR PATENT APPLICATIONS

This patent application claims benefit of International (PCT) Patent Application No. PCT/EP2019/086005, filed 18 Dec. 2019 by HPS Home Power Solutions GmbH for METHOD FOR STORING A MEDIUM IN A PRESSURE ACCUMULATOR DEVICE, which in turn claims benefit of German Patent Application No. 10 2018 133 199.1, filed 20 Dec. 2018.

The two (2) above-identified patent applications are hereby incorporated herein by reference.

FIELD OF THE INVENTION

The present invention first relates to a method for storing a medium, in particular a gas, in a pressure storage device according to the preamble of the independent claim 1. Furthermore, the present invention also relates to a computer program product, to a control device and to an energy system according to the preamble of claim 13.

BACKGROUND OF THE INVENTION

It has long been known and realized in a wide variety of ways that media, in particular gaseous media, are stored in storage devices, which are so-called pressure storage devices. When hydrogen is stored, it can, for example, get or be stored with pressures up to 700 bar in the pressure storage device. In such cases, the pressure storage device is referred to as a high-pressure storage device.

A challenge in the storage of media in pressure storage devices is, in particular, that certain pressure values within the pressure storage device may not be exceeded, such that any damage to the pressure storage device can be avoided. Frequently, there is, at the same time, the need to be able to store as much medium as possible in the pressure storage device. This is the case, in particular, when the medium is a fuel, for example for the operation of a vehicle or for the operation of an energy system.

The pressure in pressure storage systems varies as a function of the temperature, for example the ambient temperature and/or the storage temperature. In this case, a temperature-induced pressure rise behaves proportionally. That is, the temperature influence is greater, when viewed in absolute terms, at high pressures than at low pressures. The pressure storage device, as well as the pressure-carrying components in the periphery thereof, as a rule, have an operating pressure, which is the maximum permissible storage pressure, which must not be exceeded for the aforementioned reasons. If appropriate, there additionally are also safety devices which safeguard an overpressure, for example 1.1-times the operating pressure. With regard to a pressure storage device having an operating pressure of 300 bar, such an overpressure would be at 330 bar for example.

In order to explain the present invention, it will be described in the following more frequently in connection with an exemplary embodiment, in which a medium, in particular a gas, gets stored in a pressure storage device at a pressure of up to 300 bar. However, the invention is not limited to this specific embodiment.

This shall be explained on the basis of a starting example. If the operating pressure of a pressure storage device being provided as a high-pressure storage device is, for example, 300 bar, a corresponding overpressure can occur due to daily and/or seasonal temperature changes. If, for a certain period of time, for example during spring and/or at night, the storage temperature is, for example, at 10° C., and if the storage pressure, that is to say the operating pressure, is set for example to 300 bar for this temperature, and then, if during a different period of time, for example during summer and/or at day, the storage temperature would be, for example, at 40° C., the corresponding actual storage pressure would be, for example, at 342 bar. This corresponds to a value of greater than 10% in comparison to the maximum permissible overpressure. In the opposite case the picture is different. If, for a certain period of time, for example during summer and/or at day, the storage temperature is at 40° C. for example, and if for this temperature the operating pressure is set to 300 bar, for example, and if during a different period of time, for example during spring and/or at night, the storage temperature is, for example, at 10° C., the corresponding storage pressure would only be at 263 bar. In the latter case, storage capacity would therefore remain unused.

As has already been mentioned, such pressure storage devices, for example high-pressure storage devices, can be used in different systems and devices, for example in vehicles or in energy systems. By means of energy systems, energy for a wide variety of fields of application is usually generated and provided.

In a known type of such energy systems, a medium, in particular a gaseous medium, is generated in a first energy source. The medium generated can be, for example, hydrogen. The hydrogen is produced, for example, by means of electrolysis and it is stored in a second energy source device, which is, for example, a pressure storage device, in particular a high-pressure storage device. It is not unusual that the storage of hydrogen is performed with pressures up to 700 bar. The aforementioned procedure is, for example, a first mode of operation of the energy system. During the operation of the energy system, the hydrogen is withdrawn from the pressure storage device and consumed in a first energy sink device. This is, for example, a second mode of operation of the energy system. Such a first energy sink device is, for example, a fuel cell device. Usually, the aforementioned components of the energy system are spatially separated from one another and are connected to one another via a connecting line device. Both of the aforementioned modes of operation usually require a different pressure level. While, for example, pressures of 20 to 60 bar prevail in the first mode of operation with the electrolysis, for the operation of the fuel cell device in the second mode of operation, pressures of, for example, less than 20 bar are required.

In order to address the problem described above, that due to the prevailing temperature, the medium is stored in the pressure storage device with a pressure above the operating pressure, which may entail the danger of damage or destruction of the pressure storage device, it is known, for example, to over-dimension the pressure storage device with respect to the pressure-generating components, for example a compressor device, in a sufficiently large manner. However, this solution is expensive and complex. According to a different option one could, when returning back to the example described above, assign a sufficiently high static reference temperature for the pressure storage device, at which the operating pressure in the pressure storage device is to be at 300 bar.

Typically, the operating pressure, that is to say the maximum storage pressure, up to which storage into the pressure storage device is allowed to take place, is specified by the manufacturer of the pressure storage device, specifically for a defined, predetermined static reference temperature. Returning back to the above example, the manufacturer may specify, for example, that a pressure storage device is designed and thus permitted for an operating pressure of 300 bar, wherein this operating pressure is set for a defined static reference temperature, 15° C. for example. This operating pressure, which is a static operating pressure, is then later used for the storage of medium, for example of gas, into the pressure storage device, in that the storage of medium into the pressure storage device is possible at any time only up to this defined operating pressure. As can be seen from the example further above, this, however, leads to the disadvantage that the pressure storage device not seldom operates above the operating pressure, or also below its possible capacity, which is likewise disadvantageous.

From DE 10 2016 203 336 A1, a solution is known in which the maximum pressure currently possible for the pressure storage device is determined as a function of the temperature of the pressure storage device or of a gas being contained therein. The filling quantity of gas is then obtained from the respectively determined temperature-dependent maximum pressure. The temperature is measured by making use of a number of temperature sensors. The disadvantage of this known solution is that it is not always possible to avoid temporary overpressures.

SUMMARY OF THE INVENTION

It is the object of the present invention is to provide a solution, by means of which the aforementioned disadvantages are avoided. In particular, with little constructive effort, a dynamic storage of medium, in particular of hydrogen, with respect to the storage pressure, in particular of the operating pressure, is to be made possible, wherein in particular the occurrence of overpressures is avoided.

According to the invention, this object is solved by the method comprising the features according to the independent claim 1, which represents the first aspect of the invention, by the computer program product comprising the features according to the independent claim 11, which represents the second aspect of the invention, by the control device comprising the features according to the independent claim 12, which represents the third aspect of the invention, and by the energy system comprising the features according to the independent claim 13, which represents the fourth aspect of the invention.

Further features and details of the invention become apparent from the dependent claims, from the description and from the drawings. In this context, features and details which are disclosed in connection with one of the aspects of the invention apply to their full extent also in connection with the other aspects of the invention respectively, and vice versa, so that with regard to the disclosure of the individual aspects of the invention, full reference is always made to the other aspects of the invention respectively.

According to the present invention, the storage of medium, in particular gas, preferably hydrogen, is regulated as a function of a predicted temperature, the reference temperature, and optionally additionally of a determined current temperature, which is, for example, the ambient/pressure storage device temperature. Harmful overpressures due to high temperatures are prevented, at least minimized. For the storage application, the operating pressure is maximally utilized.

The basic idea of the present invention is a dynamic reference temperature-method with time-related dependency. The storage of medium in the pressure storage device is regulated as a function of a reference temperature.

A number of advantages can be realized with the present invention. Temperature-induced overpressure conditions in the pressure storage device can be avoided, at least minimized. No over-dimensioning of the pressure storage device or its peripheral components are required. At the same time, however, a maximization of stored energy prior to the consumption phase is ensured.

In particular, the present invention is directed to a method for storing a medium in a pressure storage device. However, the invention is not limited to specific storage media. The pressure storage device is preferably used for storing a gas. In the following, the invention is often explained based on an exemplary embodiment, in which hydrogen is stored. However, the invention is not limited to this particular storage medium.

The medium is at least temporarily stored in a pressure storage device and is kept in the pressure storage device during this storage time. For the purpose of consumption, the stored medium is removed from the pressure storage device, that is to say withdrawn. In particular, the pressure storage device takes over the function of a storage tank. The invention is not limited to certain types of pressure storage devices. According to a preferred embodiment, the pressure storage device is provided as a high-pressure storage device, in which, for example, the medium is stored up to a pressure of 700 bar.

Such a pressure storage device can be used in different applications, for example in vehicles or the like. According to a preferred embodiment the pressure storage device is used in an energy system, which in particular is configured as a house energy system. To illustrate the invention and the relationships according to the invention, this will now be described in particular with reference to the last-mentioned exemplary embodiment, without the invention being limited to this one specific application.

The energy system is in particular an entity composed of a plurality of components, wherein the components are connected to one another to form a dedicated unit. In the present case, the energy system is a system for generating or providing energy, preferably electrical energy.

According to a preferred embodiment, the energy system is a house energy system. House energy systems are known in principle from the state of the art and are used to supply houses, for example low-energy houses, passive houses or zero-energy houses, with energy in the form of heat and in particular in the form of current, for example current from regenerative energy sources such as, for example, photovoltaic (PV) generators or small wind power plants. Such a house energy system provides the basis that the energy requirement of a house, in particular of a low-energy house, a passive house or a zero-energy house, can be completely covered from renewable energy sources both with regard to the current and heat requirement and thus consists of complete $CO_2$ freedom during operation. At least however, the electricity demand of a house can be covered almost completely from renewable energy sources, in particular by means of a PV generator and/or a small wind power plant, in the sense of seeking an increase in self-consumption.

Such a house energy system is described, for example, in patent applications WO 2017/089468 A1 and WO 2017/089469 A1 of the applicant, the disclosure of which being incorporated into the description of the present patent application.

According to a preferred embodiment, a house power system of the type mentioned comprises the following basic features:
- a DC feed point, preferably designed for a nominal voltage of 48 volts, and/or an AC feed point, preferably designed for a voltage of 230 volts or 110 volts, wherein the DC feed point and/or the AC feed point, during operation, is connected at least temporarily to an electrical equipment having a consumption power,
- a PV generator which is electrically connected at least temporarily to the DC feed point, in order to generate an electrical PV power,
- a fuel cell unit which is electrically connected at least temporarily to the DC feed point or to the AC feed point in order to generate an electrical fuel cell power,
- an electrolysis unit electrically connected to the DC feed point for generating hydrogen to be consumed by the fuel cell unit, wherein the electrolysis unit is supplied with an electrical electrolysis input power during operation,
- a hydrogen tank, in particular as a long-term energy storing device, which is, at least temporarily, fluidically connected to the fuel cell unit and to the electrolysis unit and which is provided to store hydrogen to be generated by means of the electrolysis unit and to be consumed by the fuel cell unit,
- a storage battery unit, in particular as a short-term energy storage device, which is electrically connected or to be connected to the DC feed point, such that an electrical PV power and an electrical fuel cell power can be stored in the storage battery unit, and an electrical electrolysis input power and a consumption power can be withdrawn from the storage battery unit; and
- a control module for controlling the house power plant.

According to the first aspect of the invention, a method is provided which comprises features of independent claim 1.

The method relates to storing a medium, in particular a gas, in a pressure storage device, in particular hydrogen in a high-pressure storage device.

According to the present invention, the operating pressure, up to which medium may get stored in the pressure storage device, is determined, in particular calculated. In this case, the operating pressure is not static, that is to say invariable, but rather dynamic. This means that the operating pressure can develop, that is to say change. According to the invention, the dynamic operating pressure is a variable operating pressure. In this case, the focus in the present invention does not lie on the fact that the operating pressure changes as a function of the temperature, as being the case in the above-described solution according to the state of the art. Rather, according to the invention, in particular a dynamic operating pressure is determined, which changes over the time. This is preferably done automatically. The operating pressure in the context of the present patent application is that maximum storage pressure up to which the medium may be stored in the pressure storage device.

According to a preferred embodiment, the method is performed in a control device, or is carried out in said control device or with the aid of said control device. The control device can be, for example, an independent control device which is provided only for this one application purpose. According to another preferred embodiment, such a control device is part of an overall control device or else a functionality within such an overall control device, by means of which the overall system, for example an energy system, is controlled.

The control device preferably comprises hardware components or software components or a combination of hardware and software components. The various components are connected to form a control circuit. According to a preferred embodiment, the control device comprises a data processing device in which the method according to the invention is performed. The data processing device can comprise a storage device, or can be connected to a storage device via an interface, which can be, for example, wireless or wired. Preferably, pieces of information such as data or data files and/or computer programs which are required for carrying out the method and which are explained in more detail in the further course of the description, are stored in the storage device. In particular, a computer program product according to the second aspect of the invention as described further below can be implemented in the control device. The control device itself is preferably provided according to the third aspect of the invention as described further below.

The method according to the first aspect of the invention is used for storing a medium, in particular a gas, preferably hydrogen, in a pressure storage device. The basic feature of this method is to provide a dynamic operating pressure, which is dependent on the temperature, and up to which the medium is or may be stored in the pressure storage device. In a departure from the prior art, the operating pressure is no longer a static operating pressure as specified by the manufacturer of the pressure storage device. Rather, a dynamic, that is to say a changing operating pressure, is determined, so that in particular temperature-related overpressure in the pressure storage device can be avoided. According to the method according to the invention, this dynamic operating pressure is preferably calculated. This is explained in more detail with reference to a preferred exemplary embodiment further below.

According to the invention, the method is characterized in that the dynamic operating pressure is determined, in particular calculated, on the basis of defined dynamic reference temperature values with time-related dependency. In addition, safety devices can exist which safeguard an overpressure above the operating pressure, which can be, for example, 10% above the operating pressure. These may be, for example, bursting disks or the like. In this case, a dynamic operating pressure is such an operating pressure, the value of which moves, or develops respectively, preferably, which changes. This means in particular that the operating pressure initially changes as a function of the temperature, in this case of the reference temperature.

According to the invention, the dynamic operating pressure is determined on the basis of dynamic reference temperature values. These are thus temperature values, which move from their value, or develop respectively, preferably, which change over time. Therefore, according to the invention, it is not only the temperature itself, that is to say the temperature level, which is decisive. Rather, the reference temperature values are temperature values with a time-related dependency. This means that the reference temperature values are determined or get determined as a function of time, that is to say for specific times. The reference temperature values can change in their height over the time, in particular at specific times, so that the height of the reference temperature values is dependent on the time. How this can get realized will be described in more detail further below.

According to a preferred embodiment, the dynamic operating pressure is changed and/or adjusted and/or adapted on the basis of the dynamic reference temperature values over the time. That is, the operating pressure changes or varies at different points of time, also referred to as time values hereinafter, as described above. The points in time are either a certain short period of time, or else a longer period of time, for example a longer time interval. According to the invention, points of time with different durations can be used at the same time. In particular, it is thus realized, that the operating pressure has a different pressure value at specific points of time, so that, at these different points of time, medium up to respectively different operating pressures can be stored in the pressure storage device. Since the pressure rise in the pressure storage device is dependent on the temperature, specific temperature values, which are the reference temperature values, are preferably assigned to the different points of time or time values. The respective associated operating pressure is then determined on the basis of these determined temperature values, for example, calculated, which will be explained in more detail further below. In this case, the reference temperature values do not have to be detected by means of temperature sensors.

The reference temperature values are defined reference temperature values, that is to say specific, or determined values. The reference temperature values are, in particular, not temperature values measured by temperature sensors, but preferably predefined and/or predicted and/or calculated temperature values.

The dynamic reference temperature values ($T_{ref}$) are preferably provided as a function of time $T_{ref}=f(t)$. According to a preferred embodiment, the dynamic reference temperature values ($T_{ref}$) are provided with a calendric dependency $T_{ref}=f(dd:mm:yy)$.

According to a preferred embodiment, the time-related dependency of the dynamic reference temperature values is a calendric dependency. This means in particular that the reference temperature values are set according to the calendar and change in particular according to the calendar, for example to a date or period of time or time interval specified in the calendar. The determination can be realized, for example, for individual days, and/or individual weeks and/or months. Thus, for example, an exceedance of the pressure in the pressure storage device during summer can be avoided, in that by means of a respective reference temperature, the operating pressure is reduced in such a way that, in the event of a maximum filling of the pressure storage device, an overpressure cannot occur even in the event of a temperature rise. After summer, a dynamic reduction of the reference temperature leads to an increase in the calculated storage pressure or the maximum storage pressure respectively. A corresponding subsequent additional storage after the summer is thus possible. During the consumption time, for example during autumn/winter, the pressure storage device is maximally loaded/used. In all cases, however, it is preferably provided that the dynamic operating pressure does not exceed the static reference pressure originally specified by the manufacturer, up to which the pressure storage device is admitted. If, after the calculation of the dynamic operating pressure, any operating pressures above this static operating pressure were theoretically possible, storage of gas in the pressure storage device will be automatically stopped when the static operating pressure value is reached.

After the dynamic operating pressure has been determined, in particular calculated, which was carried out on the basis of the corresponding reference temperature values, the medium is maximally stored in the pressure storage device up to the dynamic operating pressure. If the defined dynamic operating pressure is higher than the defined static operating pressure, for example because a temperature determined in the surroundings of the pressure storage device, for example the temperature of the pressure storage device or the ambient temperature thereof, is higher than the reference temperature, then preferably the medium is stored up to the defined static operating pressure only. If the dynamic operating pressure or, as described above, the static operating pressure is reached, further storage of medium in the pressure storage device is prevented. This can be achieved, for example, by means of the control device, which, for example, controls the operation of a corresponding compressor device. If the determined dynamic operating pressure is less than the defined static operating pressure, the medium is preferably stored into the pressure storage device up to the dynamic operating pressure.

In the following, some preferred exemplary embodiments are described, how the dynamic operating pressure is determined, in particular is calculated, from the reference temperature values.

According to a first preferred embodiment, it is sufficient if only the reference temperature values with time-related dependency are present. Corresponding dynamic operating pressures are then determined for these reference temperature values. For example, suitable operating pressure values can be associated to the time varying reference temperature values, such as lower operating pressure values for the summer and higher operating pressure values for the winter. If a specific point of time is then determined on the system side, medium is only stored up to the reference temperature value and the in turn operating pressure value assigned thereto, which is assigned to the specific point of time. Such a configuration is easy to implement. However, this is achieved to the expense of flexibility.

According to another preferred embodiment, in order to determine the dynamic operating pressure, the actually prevailing temperature conditions to which the pressure storage device is exposed are additionally also included. In such a case, the dynamic operating pressure is preferably determined in that, with respect to the pressure storage device, temperature values are determined, and in that the determined temperature values are set in relation to the defined dynamic reference temperature values. Preferably, values of the ambient temperature of the pressure storage device and/or temperature values of the pressure storage device can be provided as determined temperature values. These temperature values are preferably determined via suitable temperature sensor devices, for example measured or otherwise derived. For such purposes, temperature sensor devices can be arranged, for example, in the surrounding area of the pressure storage device and/or on and/or in the pressure storage device.

According to a preferred embodiment, the dynamic operating pressure ($P_{dyn}$) is determined by calculating same according to the following formula $$P_{dyn}=P_{stat}\times(T_{amb}/T_{ref})$$

In this formula, $P_{dyn}$ stands for the dynamic operating pressure to be determined, in particular to be calculated, $P_{stat}$ stands for the static operating pressure, which is predefined by the manufacturer of the pressure storage device and up to which storage of medium in the pressure storage device is permitted, $T_{amb}$ stands for a determined temperature value in the form of the ambient temperature and/or the pressure storage temperature, and $T_{ref}$ stands for the defined dynamic reference temperature value with time-related dependency.

According to a preferred embodiment, the dynamic operating pressure is determined in that, during the course of the method, at two or more different time values, which are determined in particular, a reference temperature value is determined at each time value. The time values can be determined, for example, during the operation of the pressure storage device, which in general is the part of a larger system, for example an energy system according to the fourth aspect of the invention. For example, a corresponding timer device can be assigned to the pressure storage device. This timer device can preferably be part of the control device. In particular, the timer device has the function of determining time values and providing same to the system. This happens, for example, by means of a so-called time function or time sequence function, by means of which, in particular calendric, points of time, but also time intervals, can be determined.

At each time value, the dynamic operating pressure is then determined on the basis of the determined reference temperature values, preferably calculated, in particular modified and/or adjusted and/or adapted.

According to a preferred embodiment, this process flow can be realized as follows. In a comparison file, which is preferably provided in the form of a comparison table, a series of reference time values are stored. This can be, for example, individual days, or else individual weeks and/or months, but also time intervals consisting of a plurality of the abovementioned time values. Depending on requirements and the use case, the comparison file can be provided arbitrarily complex and finely divided or coarsely divided, respectively. In the comparison file, a specific reference temperature value is assigned to each reference time value. The comparison file is preferably such a file which has been applied before the start of the method and which is stored, for example, in a storage device which is part of a control device, or to which the control device at least temporarily accesses. Depending on the requirement, it should be possible to modify the values in the comparison file, for example the reference time values and/or the reference temperature values, from outside. The time values considered, in particular determined in the course of the method, are compared to the reference time values in the comparison file, which takes place, for example, by means of a corresponding comparator device. If a correspondence of a time value with a reference time value is determined, the operating pressure is determined on the basis of the reference temperature value being assigned to the respective reference time value, preferably calculated, in particular modified and/or adjusted and/or adapted, up to which the medium may be stored in the pressure storage device.

According to the second aspect of the invention, a computer program product is provided, which comprises the features of independent claim 11. The computer program product enables a data processing device, as soon as the computer program product is executed in the data processing device, and is preferably stored in a storage device of the data processing device, to carry out the method described above according to the first aspect of the invention. For this reason, in order to avoid repetitions at this point, full reference is made to the statements relating to the first aspect of the invention.

According to the third aspect of the invention, a control device is provided which comprises the features of the independent claim 12. The control device, which is in particular a control device as described further above, is provided in order to control the storage of a medium in a pressure storage device. According to a first embodiment, the control device is configured in such a way that it is capable of carrying out the method according to the first aspect of the invention. Alternatively, or additionally, according to another embodiment, the control device is configured in such a way that the control device comprises a data processing device or an interface to an external data processing device, wherein a computer program product according to the second aspect of the invention is executed in the data processing device. For this reason, in order to avoid repetitions at this point, full reference is made to the statements relating to the first aspect of the invention and to the second aspect of the invention.

According to the fourth aspect of the invention, an energy system is provided, which comprises the features of the independent claim 13. Preferably, the method according to the first aspect of the invention is carried out in the energy system according to the fourth aspect of the invention, so that the energy system comprises means for carrying out the method according to the first aspect of the invention. With regard to the configuration and mode of operation of the energy system, full reference is also made to the statements relating to the first aspect of the invention, in order to avoid repetitions at this point. Likewise, the computer program product according to the second aspect of the invention and the control device according to the third aspect of the invention can be part of the energy system, so that full reference is also made to these corresponding statements.

In its simplest embodiment, the energy system comprises at least one energy source device for generating a medium as well as a spatially separated pressure storage device for storing the generated medium. According to a preferred embodiment, the energy system comprises a first energy source device, which is configured as an electrolysis device, in particular for producing hydrogen, and a first energy sink device, which is configured as a fuel cell device, and a second energy source device, which is configured as a pressure storage device, in particular for storing hydrogen, and a second energy source device, which is configured as a medium-pressure storage device, in particular for temporarily storing hydrogen.

The present invention can in principle be applied to all systems, in particular storage systems, in which storage and withdrawal are influenced by seasonal temperature influences.

BRIEF DESCRIPTION OF THE DRAWINGS

The invention will now be explained in more detail with reference to an exemplary embodiment with reference to the accompanying drawings, wherein FIG. 2 depicts an example for a comparison file being provided as a comparison table, which is used during the method according to the present invention.

DETAILED DESCRIPTION OF THE PREFERRED EMBODIMENTS

Figure 1:
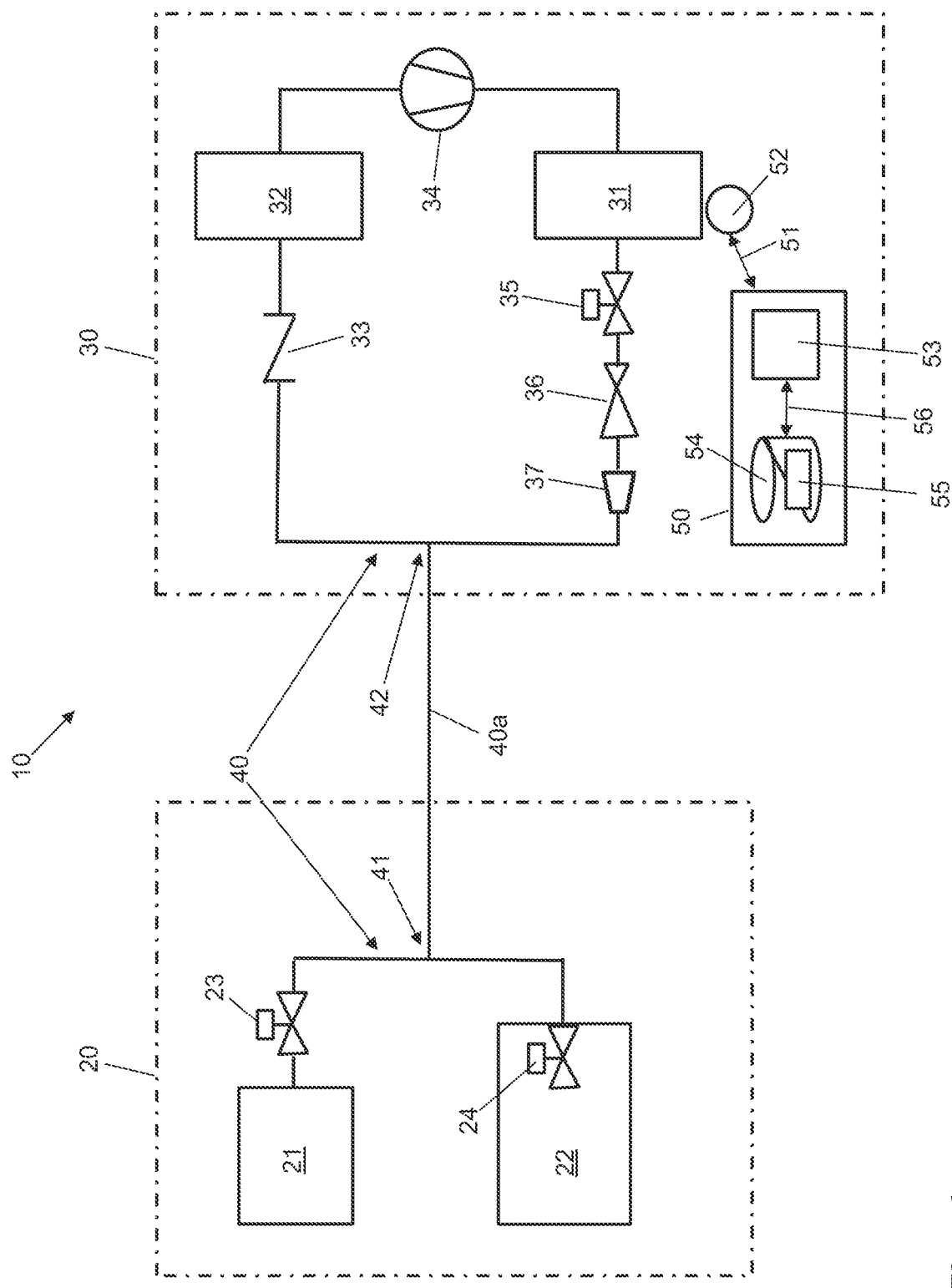
FIG. 1 is a schematic view of an energy system 10, in which the method according to the invention can be carried out.

In the embodiment, the energy system 10 is used as a house energy system. In the energy system 10, among other things, the method according to the invention is carried out. At first, the general structure of the energy system is described. Later, the course of the method is explained.

Energy system 10 initially comprises a first subsystem 20 which is configured as an inner system. That is, the first subsystem 20 is provided inside the house. In addition, the energy system 10 comprises a second subsystem 30 in the form of an outer system. That is, the second subsystem 30 is external to the house.

The first subsystem 20 comprises a first energy source device 21, which is provided as an electrolysis device for producing hydrogen. In addition, the first subsystem 20 comprises a first energy sink device 22, which is provided as a fuel cell device.

The second subsystem 30 comprises a second power source device 31, which is provided as a pressure storage device 31, in particular as a high-pressure storage device. The hydrogen produced is stored in the pressure storage device 31 at up to 700 bar. In addition, the second subsystem 30 comprises a second energy sink device 32 in the form of a medium-pressure storage device, in which the produced hydrogen is intermediately stored at pressures between 20 and 60 bar, before it is finally stored in the pressure storage device 31.

The individual components of energy system 10 are connected with one another via a connecting line device 40, which consists of a number of line sections. At least one line section 40a is configured as a so-called bidirectional line section. This means that line section 40a is bidirectionally used during operation of the energy system 10 and is flown through in both directions. In the embodiment shown the bidirectional line section 40a connects the components of the first subsystem 20 to the components of the second subsystem 30.

The first energy source device 21 is connected to the connecting line device 40 via a valve device 23. The first energy sink device 22 is connected to the connection device 40 via a valve device 24. The valve devices 23, 24 are preferably shut-off valves, for example solenoid valves.

As shown in FIG. 1, the first energy source device 21 and the first energy sink device 22 are provided on a first side 41 of the bidirectional line section 40a, whilst the pressure storage device 31 and the second energy sink device 32 are provided on a second side 42 of the bidirectional line section 40a.

The hydrogen produced in the first energy source device 21 by means of electrolysis leaves the first energy source device 21 via the connecting line device 40 and flows in particular via the bidirectional line section 40a into the second subsystem 30 and there via a check valve device 33 into the second energy sink device 32 functioning as the medium-pressure storing device. The second energy sink device 32 serves as an intermediate storage device for the hydrogen.

By means of a compressor device 34, which is in particular in the form of a piston compressor, the hydrogen intermediately stored in the second energy source device 32 is stored in the pressure storage device 31, which in particular is a high-pressure storage device. The hydrogen is compressed by the compressor device 34 to such an extent that it can be stored in the pressure storage device 31 at pressures of up to 700 bar.

The hydrogen stored in the pressure storage device 31 is used for the operation of the first energy sink device 22 in the form of the fuel cell device. However, the fuel cell device can only operate at pressures of less than 20 bar. Therefore, the hydrogen stored in the pressure storage device 31 is removed from the pressure storage device 31, is guided via a valve device 35, which can be a shut-off valve, in particular a solenoid valve, and is guided to an expansion device 36 in the form of a pressure reducer. The hydrogen can then, in particular, flow through a flow limiting device 37, which is preferably configured as a device for reducing the line cross-section. From there, the pressure reduced hydrogen is supplied via the connecting line device 40, and in this case in particular also via the bidirectional line section 40a, to the first energy sink device 22 in the form of the fuel cell device and consumed there.

To measure the ambient temperature, a corresponding temperature measuring device 52 is assigned to the pressure storage device 31. The detected temperature values of the temperature measuring device 52 are transmitted via an interface 51 to a control device 50, in which and with which the method according to the invention is carried out. For this purpose, the control device 50 comprises a data processing device 53, which is connected to a storage device 54 via a data exchange connection 56. In the storage device 54, a comparison file in the form of a comparison table 55 is stored, which is shown in FIG. 2.

The energy system 10 illustrated in FIG. 1 represents a partial area of an overall house energy system, which is a multi-hybrid house energy storage system that is electrically autonomous and that is completely based on renewable energies.

The multi-hybrid house energy storage system makes it possible that the electrical energy generated by a photovoltaic (PV) system, a small wind power plant or the like is distributed as required to the entire year. The system acts as an island system independent of the electrical network. Rather, the system is to ensure the electrical autarchy of the house, so that no electrical energy has to be drawn from the power grid over the entire year.

The primary task of the house power system is to make available the recovered electrical energy from photovoltaic (PV) modules or the like to the consumer in the household. Secondary, electrical energy excesses can be temporarily stored in a battery short-term storage device at times of low load or high irradiation. Tertiary, the electrical energy can be medium to long-term stored in the hydrogen long-term storage as gaseous hydrogen for times of low irradiation such as night, winter or the like, and can be needs-based made available again at any time by means of a fuel cell.

Besides to energy-related tasks, the system also functions as a controlled living room ventilation by means of a built-in ventilation device.

The hydrogen produced in the electrolysis device flows via the hydrogen line into the outwardly provided pressure storage system comprising the pressure storage device 31.

In the event of a lack of or insufficient PV energy, energy is supplied from the battery to cover the consumer load. If the energy stored in the short-term storage device is not sufficient, the fuel cell device can satisfy the additional electrical energy requirement. In the fuel cell operation, the hydrogen flows from the pressure storage device 31 to the fuel cell device via the hydrogen line.

The simultaneous operation of the fuel line device and the electrolysis device is excluded. The entire system is operated centrally via an energy manager with predictive energy management.

In principle, the second subsystem 30 is provided for operation in the outer region, but can also be erected and operated within a special region of the house under certain conditions.

The method according to the invention, which will now be explained in more detail, provides that the hydrogen is stored in the pressure storage device 31 as a function of a dynamic reference temperature with a calendric dependency. For this purpose, the energy system 10 comprises the control device 50, which is connected at least temporarily to the temperature measuring device 52 via interface 51.

The pressure in the pressure storage device 31 varies as a function of the storage temperature. The temperature-related increase in pressure behaves proportionally. The pressure storage device 31 and the high-pressure-conducting components in its periphery have an operating pressure which must not be exceeded. For example, this may be an operating pressure of 300 bar. This operating pressure is a so-called static operating pressure and is defined by the manufacturer of the pressure storage device 31. The pressure storage device 31 is designed and admitted for the maximum storage of medium up to this static operating pressure.

As a result of the temperature dependency of the storage pressure in the pressure storage device 31, it can happen without safety measures that there is a corresponding overpressure in the pressure storage device due to daily and/or seasonal temperature changes, so that the pressure storage device 31 gets damaged, in the worst case even destroyed. Or, temperature changes in the pressure storage device 31 result in the situation that the hydrogen is stored below the nominal pressure, so that capacities of the pressure storage device 31 remain unused.

According to the invention, the storage of the hydrogen in the pressure storage device 31 is now controlled on the basis of dynamic reference temperatures $T_{ref}$ with calendric dependency. Overpressures due to high temperatures are avoided in this case. At the same time, the nominal pressure for the storage application is maximally utilized. In order to carry out the method, the comparison file shown in FIG. 2, which is preferably a comparison table 55, comes to use.

The method according to the invention provides that, in particular in the control device 50, a dynamic operating pressure dependent on the temperature is determined, up to which the hydrogen can be stored in the pressure storage device 31. In this case, the dynamic operating pressure is determined on the basis of dynamic reference temperature values $T_{ref}$ with time-related dependency. Thus, a pressure exceeding, for example in summer, is avoided. After the summer, a dynamic reduction of the reference temperature leads to an increase in the calculated maximum storage pressure. A corresponding subsequent storage after the summer is thus possible. In the consumption time, for example during autumn/winter, the pressure storage device 31 is maximally loaded or used.

It is preferably provided that the dynamic operating pressure is determined in that, during the course of the method, at two or more time values, which are determined in particular, a reference temperature value $T_{ref}$ is determined at each time value. At each time value, the operating pressure is determined on the basis of the determined reference temperature values, for example calculated, in particular modified and/or adjusted and/or adapted.

For example, a number of reference time values 57 can be stored in the comparison table 55, wherein a reference temperature value $T_{ref}$ is assigned to each reference time value 57. In the upper row of the comparison table 55, the reference time values 57 can be found. In the example table, this are calendar reference time values 57 in the form of months or a number of months. In the example, a first reference time value includes the time period from January to August. A second reference time value includes the month September. A third reference time value includes the month October, while a fourth reference time value includes the time period of November and December. In the comparison table, a corresponding reference temperature value $T_{ref}$ is assigned to each reference time value, wherein the reference temperature values can be found in a second row of the comparison table 55. The comparison table shown is purely exemplary in nature and serves to explain the method according to the invention. The comparison table 55 can be determined or configured in any complex manner.

The time values considered, for example determined, in the course of the method are compared with the reference time values 57 in the comparison table 55. Upon a match of a time value with a reference time value 57, the dynamic operating pressure is determined, for example calculated, in particular changed and/or adjusted and/or adapted, on the basis of the reference temperature value $T_{ref}$ being assigned to the corresponding reference time value 57.

This can be carried out, for example, by the formula $$P_{dyn}=P_{stat}\times(T_{amb}/T_{ref})$$

and is explained in the following by way of an example.

It is assumed, that the static operating pressure $P_{stat}$ was set by the manufacturer of the pressure storage device 31 to 300 bar. The point in time at which the dynamic operating pressure is to be calculated is to be in the "Jan-Aug" time period. A reference temperature value $T_{ref}$ of 35° C. then applies for this period of time. It is assumed that, at the point of time of the determination of the dynamic operating pressure $P_{dyn}$, an ambient temperature $T_{amb}$ of the pressure storage device 31 of 15° C. is measured by the temperature measuring device 52. The basis for the calculation according to the above formula is temperatures which are determined in Kelvin, i.e. 273.15 K+$T_{amb}$ (° C.), or 273.15 K+$T_{ref}$(° C.) respectively. For the example, the ambient temperature $T_{amb}$ is then 288.15 K, while the reference temperature $T_{ref}$ is 308.15 K. The dynamic operating pressure $P_{dyn}$ calculated according to the above formula is then 280.5 bar. Since the temperature in the considered reference time value "Jan-Aug" can change greatly and can also exceed the measured 15° C. the pressure storage device 31 is filled only up to this calculated dynamic operating pressure of 280.5 bar, in order to avoid overpressure at other times with higher temperatures. If it were found in the calculation that dynamic operating pressures of higher than 300 bar were possible, the filling would nevertheless be terminated at the fixed static operating pressure of 300 bar.

After determination of the dynamic operating pressure, which in particular is performed in the data processing device 53 of control device 50, the hydrogen is stored into the pressure storage device 31 maximally up to the dynamic operating pressure. Monitoring, that the dynamic operating pressure is thereby not exceeded, is carried out by means of the control device 50. For this purpose, the control device 53 is in communication connection, for example, with the compressor device 34 shown in FIG. 1, and can, when the dynamic operating pressure is reached, send a corresponding control signal to compressor device 34, so that the latter ceases to store further medium into the pressure storage device 31.

LIST OF REFERENCE NUMERALS

10 Energy system (house energy system)
20 First subsystem (inner system)
21 First energy source device (electrolysis device)
22 First energy sink device (fuel cell device)
23 Valve device
24 Valve device
30 Second subsystem (outer system)
31 Pressure storage device (second energy source device)
32 Second energy sink device (medium-pressure storage device)
33 Check valve device
34 Compressor device 35 Valve device
36 Expansion device (pressure reducer)
37 Flow limiting device (capillary tube)
40 Connecting line device
40a Bidirectional line section
41 First side of the bidirectional line section
42 Second side of the bidirectional line section
50 Control device
51 Interface
52 Temperature measuring device for measuring the ambient temperature
53 Data processing device
54 Storage device
55 Comparison table
56 Data exchange connection
57 Reference time value

The invention claimed is:

1. A method for storing a medium into a pressure storage device (31), in which the operating pressure, up to which the medium may be stored in the pressure storage device, is determined in the form of a dynamic operating pressure ($P_{dyn}$) dependent on the temperature, wherein the dynamic operating pressure ($P_{dyn}$) is a variable operating pressure, characterized in that the dynamic operating pressure ($P_{dyn}$) is determined on the basis of specific defined dynamic reference temperature values ($T_{ref}$), which are assigned to determined points of time, which change at their height at the determined points of time and to which suitable operating pressure values are associated, in that the dynamic operating pressure ($P_{dyn}$) is changed and/or adjusted and/or adapted over time on the basis of the dynamic reference temperature values ($T_{ref}$), and in that, after the dynamic operating pressure ($P_{dyn}$) has been determined, the medium is stored in the pressure storage device maximally up to the dynamic operating pressure ($P_{dyn}$).

2. The method according to claim 1, characterized in that the dynamic reference temperature values ($T_{ref}$) are/get provided as a function of the time $T_{ref}=f(t)$.

3. The method according to claim 1, characterized in that the dynamic reference temperature values ($T_{ref}$) are predetermined and/or predicted and/or calculated temperature values.

4. The method according to claim 1, characterized in that the dynamic operating pressure ($P_{dyn}$) is determined in that temperature values are determined with respect to the pressure storage device (31), and in that said determined temperature values are set in relation to the defined dynamic reference temperature values ($T_{ref}$).

5. The method according to claim 4, characterized in that, for the determination of the dynamic operating pressure ($P_{dyn}$), values of the ambient temperature ($T_{amb}$) of the pressure storage device (31) and/or temperature values of the pressure storage device (31) are provided as determined temperature values.

6. The method according to claim 4, characterized in that the dynamic operating pressure ($P_{dyn}$) is determined according to the formula $$P_{dyn}=P_{stat}\times(T_{amb}/T_{ref}).$$

7. The method according to claim 1, characterized in that the dynamic operating pressure ($P_{dyn}$) is determined in that, during the course of the method, at two or more time values being different from each other, which are determined in particular, a reference temperature value ($T_{ref}$) is determined at each time value, and, at each time value, the dynamic operating pressure ($P_{dyn}$) is then determined on the basis of the determined reference temperature values ($T_{ref}$).

8. The method according to claim 7, characterized in that a number of reference time values (57) are stored in a comparison table (55), in that a reference temperature value ($T_{ref}$) is assigned to each reference time values (57), in that the time values are compared with the reference time values (57) in the comparison table (55), and in that, if a time value matches with one reference time values (57), the dynamic operating pressure ($P_{dyn}$) is determined on the basis of the reference temperature value ($T_{ref}$) assigned to the corresponding reference time value (57).

9. The method according to claim 1, characterized in that, if the determined dynamic operating pressure ($P_{dyn}$) is higher than a static operating pressure ($P_{stat}$) specified by the manufacturer of the pressure storage device (31), the medium is stored in the pressure storage device (31), after the dynamic operating pressure ($P_{dyn}$) has been determined, up to the static operating pressure ($P_{stat}$).

10. A computer program product, which enables a data processing device (53), as soon as the computer program product is executed in the data processing device (53) to carry out a method according to claim 1.

11. The method according to claim 1 further comprising providing a control device (50) to control the storage of a medium in the pressure storage device (31).

12. The method according to claim 1 further comprising providing an energy system (10) comprising at least one energy source device (21) for generating a medium and a spatially spaced apart pressure storage device (31) for storing the generated medium.

13. The method according to claim 2, characterized in that the dynamic reference temperature values ($T_{ref}$) are/get provided in particular with a calendric dependency $T_{ref}=f$(dd:mm:yy).

14. The method according to claim 11, characterized in that the control device (50) comprises a data processing device (53) or an interface to an external data processing device.

15. The method according to claim 14, wherein a computer program product is executed in the data processing device (53).

16. The method according to claim 15 wherein the computer program product enables a data processing device (53), as soon as the computer program product is executed in the data processing device (53).

17. The method according to claim 12 wherein the energy system (10) comprises a control device (50) to control the storage of a medium in the pressure storage device (31).

18. A method for storing a medium into a pressure storage device (31), in which the operating pressure, up to which the medium may be stored in the pressure storage device, is determined in the form of a dynamic operating pressure ($P_{dyn}$) dependent on the temperature, wherein the dynamic operating pressure ($P_{dyn}$) is a variable operating pressure, characterized in that the dynamic operating pressure ($P_{dyn}$) is determined on the basis of defined dynamic reference temperature values ($T_{ref}$) with time-related dependency, which are or get determined for specific points of time, and in that, after the dynamic operating pressure ($P_{dyn}$) has been determined, the medium is stored in the pressure storage device maximally up to the dynamic operating pressure ($P_{dyn}$);

wherein the dynamic operating pressure ($P_{dyn}$) is determined in that, during the course of the method, at two or more time values being different from each other, which are determined in particular, a reference temperature value ($T_{ref}$) is determined at each time value, and, at each time value, the dynamic operating pressure ($P_{dyn}$) is then determined on the basis of the determined reference temperature values ($T_{ref}$); and wherein a number of reference time values (57) are stored in a comparison table (55), in that a reference temperature value ($T_{ref}$) is assigned to each reference time values (57), in that the time values are compared with the reference time values (57) in the comparison table (55), and in that, if a time value matches with one reference time values (57), the dynamic operating pressure ($P_{dyn}$) is determined on the basis of the reference temperature value ($T_{ref}$) assigned to the corresponding reference time value (57).

* * * * *